United States Patent
Jia et al.

(10) Patent No.: US 11,615,242 B2
(45) Date of Patent: Mar. 28, 2023

(54) METHOD AND APPARATUS FOR STRUCTURING DATA, RELATED COMPUTER DEVICE AND MEDIUM

(71) Applicant: BEIJING BAIDU NETCOM SCIENCE AND TECHNOLOGY CO., LTD., Beijing (CN)

(72) Inventors: Wei Jia, Beijing (CN); Dai Dai, Beijing (CN); Xinyan Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 322 days.

(21) Appl. No.: 16/940,703

(22) Filed: Jul. 28, 2020

(65) Prior Publication Data

US 2021/0191937 A1    Jun. 24, 2021

(30) Foreign Application Priority Data

Dec. 20, 2019    (CN) .......................... 201911324544.2

(51) Int. Cl.
*G10L 15/00* (2013.01)
*G06F 40/284* (2020.01)
*G06F 40/211* (2020.01)

(52) U.S. Cl.
CPC .......... *G06F 40/284* (2020.01); *G06F 40/211* (2020.01)

(58) Field of Classification Search
None
See application file for complete search history.

(56) References Cited

U.S. PATENT DOCUMENTS

| | | | |
|---|---|---|---|
| 10,482,176 B2* | 11/2019 | Patwardhan | .......... G06F 40/166 |
| 2018/0341860 A1 | 11/2018 | Shazeer et al. | |
| 2019/0026550 A1* | 1/2019 | Yang | ................ G06V 30/19147 |
| 2020/0034520 A1* | 1/2020 | Kim | ........................ G06N 3/04 |

FOREIGN PATENT DOCUMENTS

| | | |
|---|---|---|
| CN | 105022733 A | 11/2015 |
| CN | 107943860 A | 4/2018 |
| CN | 109800411 A | 5/2019 |
| CN | 110362823 A | 10/2019 |

OTHER PUBLICATIONS

CNIPA Examiner, "Office Action for CN Application No. 201911324544.2", dated Aug. 25, 2020, CNIPA, China.
Igawa Yuichiro et al., "The mathematical formula XML analysis document in the Paper PDF based on the transition phrase structure analysis", IPSJ SIG Technical Report, vol. 2017-NL-231 No. 13, vol. 2017-SLP-116No. 13, May 15, 2017, Japan.
Yukiko Cho, "Office Action for JP Application No. 2020-203999", dated Jan. 5, 2022, JPO, Japan.

* cited by examiner

*Primary Examiner* — Satwant K Singh
(74) *Attorney, Agent, or Firm* — Bridgeway IP Law Group, PLLC; Jihun Kim

(57) ABSTRACT

A method and an apparatus for structuring data are related to information processing technologies in the field of natural language processing. By acquiring an unstructured text and inputting the unstructured text into an encoder-decoder model, an output sequence is obtained. The encoder-decoder model is trained using a training text marked with the attribute value of each attribute. A structured representation is generated based on the attributes corresponding to the attribute elements included in the output sequence and the attribute values comprised in the attribute elements.

15 Claims, 3 Drawing Sheets

METHOD AND APPARATUS FOR STRUCTURING DATA, RELATED COMPUTER DEVICE AND MEDIUM

CROSS REFERENCE TO RELATED APPLICATIONS

This application claims priority and benefits to Chinese Application No. 201911324544.2, filed on Dec. 20, 2019, the entire content of which is incorporated herein by reference.

FIELD

The present disclosure relates to a field of information processing technologies in the field of natural language processing, and particularly, to a method and an apparatus for structuring data, a related computer device, and a medium.

BACKGROUND

In various industries, it is common to record a text in natural language, and this text is often unstructured. For example, this text includes financial statement, news, medical record, and the like. At present, there is a requirement to extract structured information in various application scenarios such as a public opinion analysis, a dissemination analysis, a data platform service and the like. That is, a required structured field may be extracted from the unstructured text. For example, a company name may be extracted from the financial statement, a place name of an attack event may be extracted from the news, and patient's situation may be extracted from the medical record.

SUMMARY

Embodiments of the present disclosure provides a method for structuring data. The method includes:
acquiring an unstructured text;
inputting the unstructured text into an encoder-decoder model to obtain an output sequence; the output sequence including a plurality of attribute elements, each attribute element corresponding to a respective attribute, each attribute element including an attribute value of the respective attribute, and the encoder-decoder model being trained using a training text marked with the attribute value of each attribute; and generating a structured representation based on the attributes corresponding to the attribute elements included in the output sequence and the attribute values included in the attribute elements.

Embodiments of the present disclosure provides a computer device. The computer device includes at least one processor, and a memory communicatively coupled to the at least one processor. The memory stores instructions executable by the at least one processor. When the instructions are executed by the at least one processor, the at least one processor is caused to perform the method for structuring data described above.

Embodiments of the present disclosure provides a non-transitory computer readable storage medium, having computer instructions thereon. The computer instructions are configured to cause a computer to execute the method for structuring data as described above.

Other effects of the above alternative will be described below with reference to specific embodiments.

BRIEF DESCRIPTION OF THE DRAWINGS

Accompanying drawings are used to provide a better understanding of the present disclosure rather than to limit the present disclosure, in which.

DETAILED DESCRIPTION

The following description of exemplary embodiments of the present disclosure, taken in conjunction with the accompanying drawings, includes various details of embodiments of the present disclosure to assist in understanding, which are to be considered exemplary only. Accordingly, those skilled in the art will recognize that various changes and modifications of the embodiments described herein can be made without departing from the scope and spirit of the present disclosure. Also, descriptions of well-known functions and constructions are omitted in the following description for clarity and conciseness.

At present, an existing method for extracting structured information is developed and designed by developers through programming, which needs different extraction strategies for different application scenarios, so that the method has a weak capability to be ported to various scenarios.

In order to solve a technical problem that when extracting structured information from an unstructured text using certain extraction strategies in the related art, it is required to set different extraction strategies in different scenarios, such that the method has a weak capability to be ported to various scenarios, the present disclosure provides a method for structuring data. By obtaining the unstructured text and by inputting the unstructured text into an encoder-decoder model, an output sequence is obtained. The output sequence includes multiple attribute elements, each attribute element corresponds to a respective attribute, and each attribute element includes an attribute value of the respective attribute. The encoder-decoder model is trained using a training text marked with the attribute value of each attribute. A structured representation is generated based on the attributes corresponding to the attribute elements included in the output sequence and the attribute values included in the attribute elements. Therefore, it is only required to set different attribute values in different scenarios to generate the structured representation, when extracting structured data from the unstructured text by adopting the encoder-decoder model, thereby improving portability and universality of the model and being suitable for many extraction requirements.

The method and the apparatus for structuring data, and a related electronic device according to embodiments of the present disclosure will be described with reference to the drawings.

Figure 1:
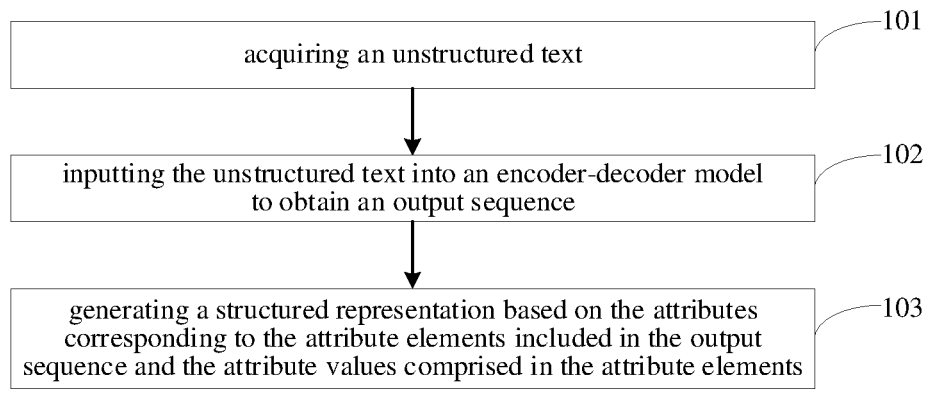
FIG. 1 is a schematic flowchart illustrating a method for structuring data according to embodiments of the present disclosure.

FIG. 1 is a schematic flowchart illustrating a method for structuring data according to embodiments of the present disclosure.

Embodiments of the present disclosure will be described by applying the method for structuring data to an apparatus for structuring data for example. The apparatus for structuring data may be integrated in a computer device, so that the computer device may execute functions of structuring data.

The computer device may be a Personal Computer (PC), a cloud device, a mobile device, and the like. The mobile device may be a hardware device having various operating systems, such as a mobile phone, a tablet computer, a personal digital assistant, a wearable device, and the like.

As illustrated in FIG. 1, the method for structuring data may include the following.

At block 101, the unstructured text is acquired.

The unstructured text refers to a text recorded in a natural language. For example, the unstructured text may be a personal resume, a medical record of a patient, a news, etc.

In a possible case, the unstructured text may be a text input by a user. For example, the unstructured text may be input by the user manually, or the unstructured text may be input by means of voice. A manner of inputting the unstructured text by the user is not limited in embodiments of the present disclosure.

In another possible case, the unstructured text may also be a text downloaded from a server. For example, the medical record of the patient may be downloaded from a medical record management system in a hospital.

It should be noted that, the unstructured text may include a large amount of information, and the data volume of the unstructured text is large. Therefore, some structured fields need to be extracted from the unstructured text. For example, a company name is extracted from the financial report, a cancer stage status of a patient is extracted from the medical record, user's skills are extracted from the personal resume, and the like.

At block 102, the unstructured text is input into an encoder-decoder model to obtain an output sequence.

The output sequence may include multiple attribute elements. Each attribute element may correspond to a respective attribute. Each attribute element may include the attribute value of the respective attribute.

In the related art, when extracting the structured information from the unstructured text, there is a need to set different extraction strategies for the unstructured texts in different fields. However, in the present disclosure, by setting different attributes in the different scenarios and by inputting the unstructured text into the encoder-decoder model, the obtained output sequence may include the multiple attribute elements each corresponding to the respective attribute and each including the attribute value of the respective attribute.

For example, the unstructured text may be "a tumor with a diameter of 3 cm can be seen in the stomach". The output sequence obtained by inputting the unstructured text into the encoder-decoder model may be "{"tumor location": "stomach", "tumor size": "3 cm"}". It can be seen that, the output sequence includes two attribute elements, i.e. the tumor location and the tumor size. Each attribute element includes the attribute value of the respective attribute, i.e. stomach and 3 cm respectively.

In embodiments of the present disclosure, the encoder-decoder model may be obtained and trained using a training text marked with the attribute value of each attribute. Therefore, after the unstructured text is input into the encoder-decoder model, the obtained output sequence may include the multiple attribute elements, and each attribute element includes the attribute value of the corresponding attribute.

When extracting the structured information from the unstructured text in different fields, it only requires to set the attributes and to retrain the encoder-decoder model using the training text that is marked manually, such that the structured text may be obtained by using the trained model. Therefore, the portability and the universality of the model may be improved, and the workload of developers may be reduced.

It may be understood that, the encoder-decoder model may include an encoder and a decoder. The encoder is configured to encode the unstructured text to obtain an encoded vector. The decoder is configured decode the encoded vector to obtain the attribute values included in the output sequence.

In a possible case, the output sequence obtained by inputting the unstructured text into the encoder-decoder model may be in a data exchange format. The output sequence in the data exchange format may include at least one object, and each object may include multiple attribute elements.

Date may be exchanged between different programs of the computer or between different programming language using a "language" that is understood and usable by programs or programming languages. This "language" is the data exchange format, for describing data by text in a particular format. For example, commonly used data exchange format by the computer device may include an extensible markup language (XML), a JavaScript object notation (JSON), and yet another markup language (YAML ain't markup language (YAML)), and the like.

At block 103, the structured representation is generated based on the attributes corresponding to the attribute elements included in the output sequence and the attribute values included in the attribute elements.

In embodiments of the present disclosure, after the output sequence including the multiple attribute elements is obtained by inputting the unstructured text into the encoder-decoder model, the structured representation may be generated based on the attributes corresponding to the attribute elements included in the output sequence and the attribute values included in the attribute elements.

Continuing with the above example, the output sequence is "{"tumor location": "stomach", "tumor size": "3 cm"}", which includes two attribute elements, i.e., the tumor location and the tumor size. Each attribute element has a respective attribute value of a corresponding attribute, i.e., stomach and 3 cm respectively. Thus, based on the attributes corresponding to the attribute elements included in the output sequence and the attribute values included in the attribute elements, the structured representation may be generated as "tumor position: stomach & tumor size: 3 cm".

In a possible case, the attribute value of each attribute is one of a text position and an actual text. The attribute value of each attribute may be determined based on a value range of the attribute. In cases that the value range is limited, the corresponding attribute value may be the actual text. In cases that the value range is unlimited, the attribute value may be the text position. Before generating the structured representation based on the attributes corresponding to the attribute elements include in the output sequence and the attribute values included in the attribute elements, it may be determined for each attribute element, whether the attribute value is the text position.

In a possible case, for the attribute element, if the included attribute value is the text position, the corresponding attribute value may be updated to a word element included in the unstructured text at the text position.

For example, the value range of the tumor size (which is the attribute) is unlimited. Therefore, the attribute value included in the attribute element is the text position.

With the method for structuring data according to embodiments of the present disclosure, by acquiring the unstructured text and by inputting the unstructured text into the encoder-decoder model, the output sequence including multiple attribute elements is obtained. Each attribute element corresponds to a respective attribute, and each attribute element includes the attribute value of the respective attribute. The encoder-decoder model is obtained and trained using the training text marked with the attribute value of each attribute. The structured representation is generated based on the attributes corresponding to the attribute elements included in the output sequence and the attribute values included in the attribute elements. With the method, the output sequence including multiple attribute elements and attribute values of attributes may be obtained by inputting the unstructured data into the encoder-decoder model, and the structured representation may be generated based on the output sequence. Therefore, it is only required to set different attributes and retrain the model using the training text that is marked manually when extracting structured data from the unstructured text in different scenarios, thereby improving the portability and the universality of the model.

Figure 2:
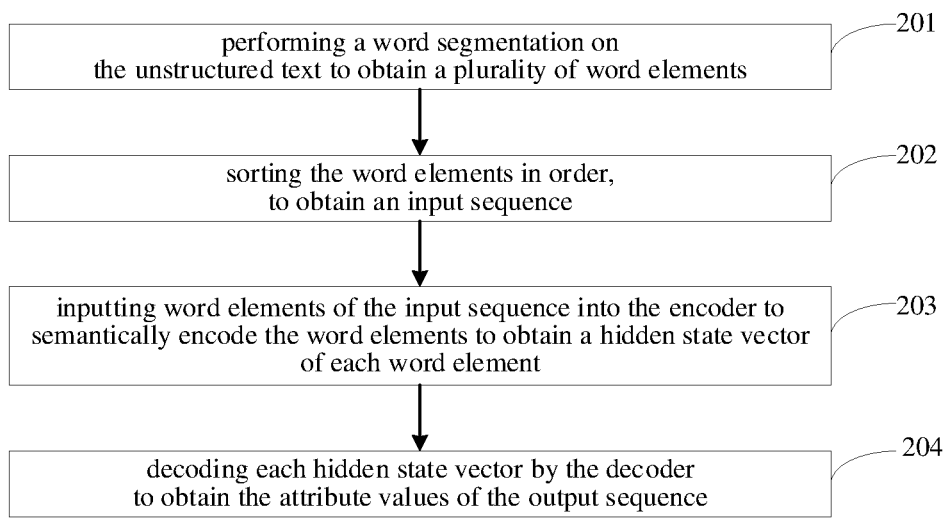
FIG. 2 is a schematic flowchart illustrating a method for structuring data according to embodiments of the present disclosure.

On the basis of the above, in the above block 102, as a possible implementation, the word segmentation may be performed on the unstructured text to obtain multiple word elements. The multiple word elements may be sorted in order to obtain an input sequence. The multiple word elements of the input sequence may be input into an encoder to semantically encode the multiple word elements to obtain a hidden state vector of each word element. Each hidden state vector may be decoded by a decoder to obtain the attribute values included in the output sequence. The above processes may be described in detail with reference to FIG. 2. FIG. 2 is a schematic flowchart illustrating a method for structuring data according to embodiments of the present disclosure.

As illustrated in FIG. 2, the block 102 may further include the following.

At block 201, the word segmentation is performed on the unstructured text to obtain multiple word elements.

Performing the word segmentation on the unstructured text is to segment the unstructured text into individual words.

In embodiments of the present disclosure, before the unstructured text is input into the encoder-decoder model, the word segmentation may be performed on the unstructured text to segment the unstructured text into multiple word elements.

At block 202, the multiple word elements are sorted in order, to obtain an input sequence.

In embodiments of the present disclosure, after the multiple word elements are obtained by performing the word segmentation on the unstructured text, the input sequence is obtained by sorting the word elements in order.

As a possible implementation, the multiple word elements may be respectively input into an entity recognition model to obtain an entity tag of each word element. Each word element may be spliced with the entity tag as an element of the input sequence.

At block 203, the multiple word elements of the input sequence are input into an encoder to semantically encode the multiple word elements to obtain the hidden state vector of each word element.

The hidden state vector may indicate semantics of the word element and a context thereof. Semantically coding is to process information by words. For example, processing information by words is to classify the information according to meanings of words or organize and summarize a speech material (i.e. the information) in specified language so as to find out a basic argument, a fact and a logic structure of the material. That is, the semantically coding is encoding according to semantic features.

In a natural language processing, a natural language text is an indefinite-length sequence formed by sequentially splicing multiple symbols. It is difficult to directly convert the natural language text into numerical data that can be understood by a computer, and thus the natural language text cannot directly used for further processing, such as calculation. The hidden state vector includes rich information, such that the deep learning may process most of natural language processing applications.

In embodiments of the present disclosure, the multiple word elements of the input sequence may be input to the encoder, to semantically encode the multiple word elements to obtain the hidden state vector of each word element. The obtained hidden state vector of each word element may indicate the semantics of the corresponding word element and the context thereof.

It should be noted that, there are many methods for generating the hidden state vector of the corresponding word element from the multiple word elements of the input sequence. For example, a bi-directional long short-term memory (BiLSTM), a self attention mechanism, a convolutional neural network (CNN) may be used.

In embodiments of the present disclosure, there is no limitation on the encoding technology adopted by the encoder.

At block 204, each hidden state vector is decoded by a decoder to obtain the attribute values of the output sequence.

The decoder has learned an attention weight of each hidden state vector with respect to each attribute value and a mapping relation between the hidden state vector that is weighted based on the attention weight and the attribute value.

In embodiments of the present disclosure, an attention model may be used when each hidden state vector is decoded by the decoder, such that the attribute values of the output sequence may be obtained by the decoder based on the attention weight of each hidden state vector with respect to each attribute value and based on the mapping relation between the hidden state vector that is weighted by the attention weight and the attribute value.

The attention model, i.e. the attention mechanism, may be classified into spatial attention or temporal attention. The attention model may be also classified into soft attention or hard attention. The soft attention may pay attention to all data and obtain attention weights for all data, without setting a screening condition. The hard attention may screen out some attention weights that does not meet a condition after generating the attention weights for all data, i.e, sets the attention weights that are screened out to 0. It may be understood that, those not meet the condition are not paid attention to.

With the method for structuring data according to embodiments of the present disclosure, the multiple word elements are obtained by performing the word segmentation on the unstructured text. The multiple word elements are sorted in order, to obtain the input sequence. The multiple word elements of the input sequence are input into the encoder to semantically encode the word elements to obtain the hidden state vector of each word element. Each hidden state vector is decoded by the decoder to obtain the attribute values of the output sequence. The decoder has learned the attention weight of each hidden state vector with respect to each attribute value and the mapping relation between the hidden state vector that is weighted by the attention weight and the attribute value. Thus, the unstructured text may be converted by the encoder-decoder model into the output sequence including the attribute values.

Figure 3:
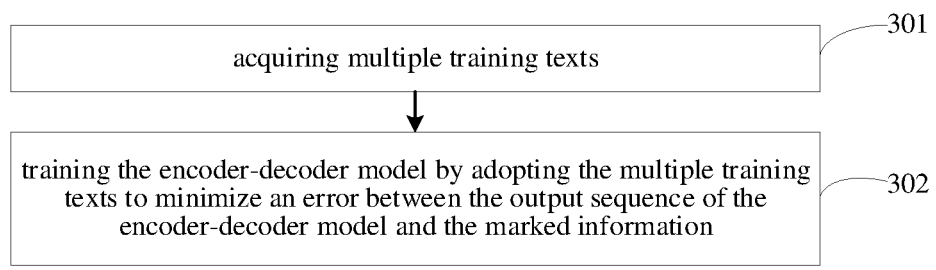
FIG. 3 is a schematic flowchart illustrating a method for structuring data according to embodiments of the present disclosure.

In embodiments of the present disclosure, before the unstructured text is input into the encoder-decoder model to obtain the output sequence, the encoder-decoder model may be trained using multiple training texts, to minimize an error between the output sequence of the encoder-decoder model and corresponding marked information. The above processes will be described in detail with reference to FIG. 3. FIG. 3 is a schematic flowchart illustrating a method for structuring data according to embodiments of the present disclosure.

As illustrated in FIG. 3, the method for structuring data may include the following.

At block 301, multiple training texts are acquired.

In embodiments of the present disclosure, each training text has marked information in a data exchange format. The marked information includes at least one object corresponding to an entity described by the training text. Each object includes the attribute values of attributes for describing the entity. An ordering of the attribute values of the attributes of an object is the same as the ordering of the attribute elements of the attributes of the output sequence.

It may be understood that, the training text is also the unstructured text. When the encoder-decoder model is trained using the training text, each training text has the marked information in the data exchange format corresponding to the training text.

When the training text is marked, as a possible case, the marking may be divided into different tasks. For example, 2000 pieces of data may be selected from the data and marked firstly. The above task may be named by "firstly marking gastric cancer pathology". The model may be trained by selecting data generated by any one of the different tasks. Therefore, it is convenient for different model versions of different extraction tasks of data management.

In embodiments of the present disclosure, the word segmentation may be also performed on the training text to obtain multiple word elements. The multiple word elements may be input into the entity recognition model to obtain an entity tag of each word element. The word element is spliced with the corresponding entity tag as an element of the input sequence.

It should be noted that, the training text may be a text downloaded from a server, or may be a text manually input by the user, which is not limited herein.

At block 302, the encoder-decoder model is trained by adopting multiple training texts to minimize an error between the output sequence of the encoder-decoder model and the marked information.

In embodiments of the present disclosure, the multiple training texts are adopted to train the encoder-decoder model, the attribute corresponding to each attribute element and the attribute value included in the attribute element may be determined based on the output sequence and the error between the output sequence of the encoder-decoder model and the corresponding marked information may be minimized after the model is trained for many times. Further, the structured information may be accurately obtained from the output of the encoder-decoder model.

Figure 4:
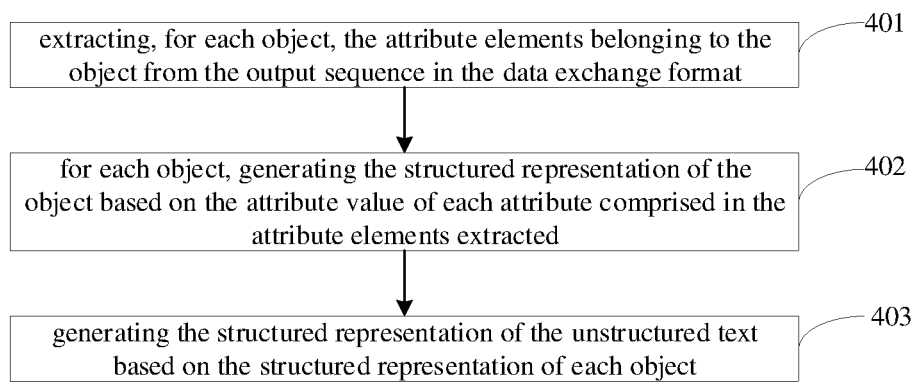
FIG. 4 is a schematic flowchart illustrating a method for structuring data according to embodiments of the present disclosure.

With the method for structuring data according to embodiments of the present disclosure, by acquiring the multiple training texts, the encoder-decoder model is trained by adopting the multiple training texts to minimize the error between the output sequence of the encoder-decoder model and the marked information. Therefore, the encoder-decoder model is trained by adopting the training text with the marked information, the structured information may be accurately obtained according to the output of the encoder-decoder model after the unstructured text is input into the encoder-decoder model. Accuracy of extracting structured information may be improved. On the basis of the above, the structured representation may be generated after the unstructured text is input into the encoder-decoder model that is trained by adopting the multiple training texts. As a possible implementation, for each object, an attribute element belonging to the object may be extracted from the output sequence in the data exchange format. For each object, the structured representation of the object may be generated based on the attribute value of the attribute includes in the attribute element extracted. The structured representation of the unstructured text may be generated based on the structured representation of each object. The above processes will be described in detail with reference to FIG. 4. FIG. 4 is a schematic flowchart illustrating a method for structuring data according to embodiments of the present disclosure.

As illustrated in FIG. 4, the method for structuring data may further include the following.

At block 401, for each object, attribute elements belonging to the object are extracted from the output sequence in the data exchange format.

In embodiments of the present disclosure, the unstructured text is input into the encoder-decoder model, to obtain the output sequence in the data exchange format. The output sequence in the data exchange format may include at least one object. Each object may include multiple attribute elements. Thus, for each object, the attribute elements belonging to the object may be extracted from the output sequence in the data exchange format.

For example, the output sequence in the data exchange format is {"tumor location": "stomach", "tumor size": "3 cm"}". It can be seen that, the output sequence includes two attribute elements, i.e., the tumor location and the tumor size, respectively. The two attribute elements included in the output sequence belong to a single object, i.e., tumor. The attribute elements belonging to a same object may be extracted from the output sequence as the tumor location and the tumor size.

It should be noted that, when multiple objects are included in the output sequence in the data exchange format, the attribute elements belonging to each object may be extracted from the output sequence in the data exchange format.

At block 402, for each object, the structured representation of the object is generated based on the attribute value of each attribute included in the attribute elements extracted.

In embodiments of the present disclosure, when extracting, for each object, the attribute elements belonging to the object from the output sequence in the data exchange format, for each object, the corresponding structured representation may be generated based on the attribute value of each attribute included in the attribute elements extracted.

Continuing with the above example, the output sequence in the data exchange format is {"tumor position": "stomach", "tumor size": "3 cm"}". The attribute elements belonging to the object (such as tumor) in the output sequence are "tumor position" and "tumor size" respectively. The attribute values of attribute included in the attribute elements are "stomach" and "3 cm" respectively. In this case, based on the attribute value of each attribute included in the attribute elements extracted, the structured representation of the object may be generated as tumor location: stomach & tumor size: 3 cm.

At block 403, the structured representation of the unstructured text is generated based on the structured representation of each object.

In embodiments of the present disclosure, for each object, after the structured representation of the object is generated based on the attribute value of each attribute included in the attribute elements extracted, the structured representation of the unstructured text may be generated based on the structured representation of each object.

With the method for structuring data according to embodiments of the present disclosure, by extracting, for each object, the attribute elements belonging to the object from the output sequence in the data exchange format, the structured representation of the object is generated based on the attribute value of each attribute included in the attribute elements extracted, and the structured representation of the unstructured text is generated based on the structured representation of the object. Therefore, the structured representation of the unstructured text in different scenarios may be obtained by setting each attribute.

In order to implement the above embodiments, the present disclosure provides an apparatus for structuring data.

Figure 5:
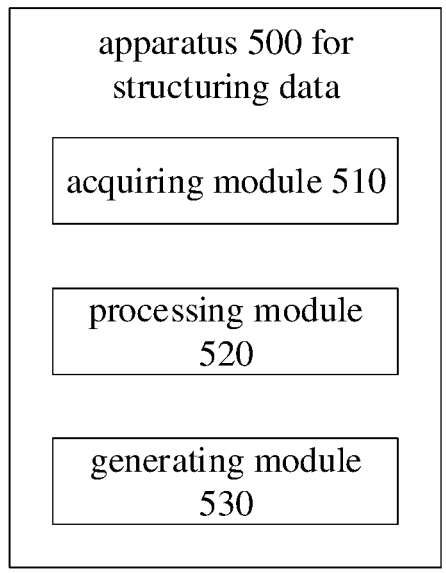
FIG. 5 is a schematic diagram illustrating an apparatus for structuring data according to embodiments of the present disclosure.

FIG. 5 is a schematic diagram illustrating an apparatus for structuring data according to embodiments of the present disclosure.

As illustrated in FIG. 5, the apparatus 500 may include an acquiring module 510, a processing module 520, and a generating module 530.

The acquiring module 510 is configured to configured to acquire an unstructured text.

The processing module 520 is configured to input the unstructured text into an encoder-decoder model to obtain an output sequence. The output sequence includes multiple attribute elements. Each attribute element corresponds to a respective attribute and each attribute element includes an attribute value of the respective attribute. The encoder-decoder model is obtained and trained using a training text marked with the attribute value of each attribute.

The generating module 530 is configured to generate the structured representation based on the attributes corresponding to the attribute elements included in the output sequence and the attribute values included in the attribute elements.

As a possible case, the encoder-decoder model includes an encoder and a decoder.

The processing module 520 may be further configured to perform a word segmentation on the unstructured text to obtain multiple word elements; sort the multiple word elements in order, to obtain an input sequence; input the word elements of the input sequence into the encoder to semantically encode the word elements to obtain a hidden state vector of each word element. The hidden state vector indicates semantics of the word element and the context thereof. The processing module 520 may be further configured to decode each hidden state vector by adopting the decoder to obtain the attribute values of the output sequence. The decoder has learned an attention weight of each hidden state vector with respect to a respective attribute value and a mapping relation between the hidden state vector that is weighted by the attention weight and the attribute value.

As another possible case, the output sequence is in the data exchange format. The output sequence in the data exchange format includes at least one object. Each object includes multiple attribute elements.

The apparatus 500 may further include a text acquiring module and a training module.

The text acquiring module is configured to acquire multiple training texts. Each training text has corresponding marked information in the data exchange format. The marked information includes at least one object corresponding to an entity described by the training text. Each object includes the attribute value of each attribute for describing the entity. An order of the attribute values of attributes in the object is the same as an order of the attribute elements of the corresponding attributes in the output sequence.

The training module is configured to train the encoder-decoder model by adopting multiple training texts to minimize an error between the output sequence of the encoder-decoder model and the marked information.

As another possible case, the generating module 530 may be further configured to extract, for each object, the attribute elements belonging to the object from the output sequence in the data exchange format; generate, for each object, the structured representation of the object based on the attribute value of each attribute included in the attribute elements extracted; and generate the structured representation of the unstructured text based on the structured representation of each object.

As another possible case, the attribute value of each attribute is one of text position and actual text. The attribute value is determined based on a value range of the attribute. If the value range is limited, the attribute value is the actual text. If the value range is unlimited, the attribute value is the text position.

The apparatus 500 may further include an updating module. The updating module is configured to, for each attribute element, if the attribute value is the text position, update the attribute value to the word element of the unstructured text at the text position.

As another possible case, the processing module 520 may further be configured to input the multiple word elements into an entity recognition model to obtain an entity label of each word element; and splice each word element with a respective entity label as an element of the input sequence.

It should be noted that, the above explanation of the embodiment of the method is also applicable to the apparatus, which is not elaborated here.

With the apparatus for structuring data according to embodiments of the present disclosure, by acquiring the unstructured text and by inputting the unstructured text into the encoder-decoder model, the output sequence including multiple attribute elements is obtained. Each attribute element corresponds to a respective attribute, and each attribute element includes the attribute value of the respective attribute. The encoder-decoder model is obtained and trained using the training text marked with the attribute value of each attribute. The structured representation is generated based on the attributes corresponding to the attribute elements included in the output sequence and the attribute values included in the attribute elements. With the method, the output sequence including multiple attribute elements and attribute values of attributes may be obtained by inputting the unstructured data into the encoder-decoder model, and the structured representation may be generated based on the output sequence. Therefore, it is only required to set different attributes and retrain the model using the training text that is marked manually when extracting structured data from the unstructured text in different scenarios, thereby improving the portability and the universality of the model.

According to embodiments of the present disclosure, a related computer device and a readable storage medium are also provided.

Figure 6:
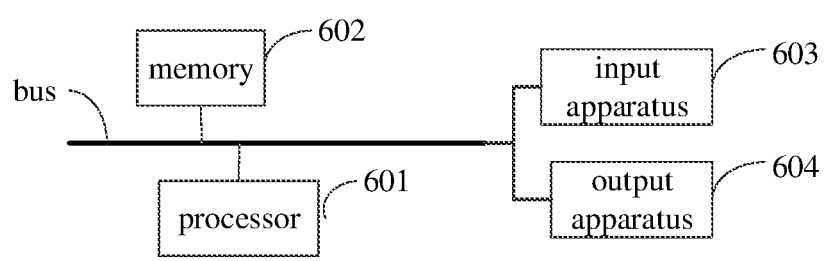
FIG. 6 is a block diagram illustrating a computer device for implementing the method for structuring data according to embodiments of the present disclosure.

FIG. 6 is a block diagram illustrating a computer device for implementing a method for structuring data according to embodiments of the present disclosure. The computer device is intended to represent various forms of digital computers, such as a laptop, a desktop, a workstation, a personal digital assistant, a server, a blade server, a mainframe, and other appropriate computers. The computer device may also represent various forms of mobile apparatuses, such as a personal digital processing, a cellular phone, a smart phone, a wearable device, and other similar computing apparatuses. The components shown herein, their connections and relations, and their functions, are meant to be exemplary only, and are not meant to limit implementations of the present disclosures described and/or claimed herein.

As illustrated in FIG. 6, the computer device includes: one or more processors 601, a memory 602, and interfaces for connecting the various components, including high-speed interfaces and low-speed interfaces. The various components are interconnected using different buses and may be mounted on a common motherboard or in other manners as desired. The processor may process instructions for execution within the computer device, including instructions stored in or on the memory to display graphical information for a GUI on an external input/output apparatus (such as a display device coupled to the interface). In other embodiments, multiple processors and/or multiple buses may be used, along with multiple memories, if desired. Also, multiple computer devices may be connected, with each device providing portions of necessary operations (e.g., as an array of servers, a group of blade servers, or a multi-processor system). One processor 601 is illustrated in FIG. 6.

The memory 602 is a non-transitory computer readable storage medium as provided herein. The memory stores instructions executable by at least one processor to cause the at least one processor to perform the structured processing method provided herein. The non-transitory computer readable storage medium of the present disclosure stores computer instructions for causing a computer to execute the method for structuring data according to the present disclosure.

The memory 602, which is a non-transitory computer readable storage medium, may be used to store non-transitory software programs, non-transitory computer executable programs, and modules, such as program instructions/modules (e.g., the acquisition module 510, 520 and the generating module 530 shown in FIG. 5) corresponding to the structured processing method in embodiments of the present disclosure. The processor 601 executes various functional applications of the server and data processing, i.e., implements the structured processing method in the above method embodiments, by running non-transitory software programs, instructions, and modules stored in the memory 602.

The memory 602 may include a storage program area and a storage data area, the storage program area may store an operating system, an application program required for at least one function; the storage data area may store data created from use of the computer device of the structured processing, and the like. Further, the memory 502 may include a high speed random access memory, and may also include a non-transitory memory, such as at least one magnetic disk storage device, a flash memory device, or other non-transitory solid state storage device. In some embodiments, the memory 602 optionally includes memory remotely located from the processor 601, and such remote memory may be connected to the structured processing computer device over a network. Examples of such networks include, but are not limited to, an internet, an intranet, a local area network, a mobile communication network, and combinations thereof.

The computer device for implementing the method for structuring data may further include an input apparatus 603 and an output apparatus 604. The processor 601, the memory 602, the input apparatus 603 and the output apparatus 604 may be connected by the bus or other means, and are illustrated as being connected by a bus in FIG. 6.

The input apparatus 603 may receive input numeric or character information and generate a key signal input related to a user setting and a function control of a structured processing computer device, such as a touch screen, a keypad, a mouse, a track pad, a touch pad, a pointer stick, one or more mouse buttons, a track ball, a joystick or like input apparatus. The output devices 604 may include a display device, an auxiliary lighting apparatus (e.g., LED), and a tactile feedback apparatus (e.g., a vibrating motor), and the like. The display device may include, but is not limited to, a Liquid Crystal Display (LCD), a Light Emitting Diode (LED) display, and a plasma display. In some implementations, the display device may be a touch screen.

Various implementations of the system and technology described herein may be realized in a digital electronic circuit system, an integrated circuit system, an ASIC (application specific integrated circuit), a computer hardware, a firmware, a software, and/or combinations thereof. These various implementations may include the followings. The system and technology may be implemented in one or more computer programs that are executable and/or interpretable on a programmable system including at least one programmable processor, which may be a special programmable processor or a general programmable processor, data and instructions are received from a storage system, at least one input apparatus, and at least one output apparatus, and data and instructions are transmitted to the storage system, the at least one input apparatus, and the at least one output apparatus.

These computer programs (also known as programs, software applications, or code) include machine instructions for a programmable processor, and may be implemented using high-level procedural and/or object-oriented programming languages, and/or assembly/machine languages. As used herein, the terms "machine-readable medium" and "computer readable medium" refer to any computer program product, device, and/or apparatus (e.g., a magnetic disc, an optical disk, a memory, a Programmable Logic Device (PLD)) used to provide the machine instructions and/or data to the programmable processor, including a machine-readable medium that receives the machine instructions as a machine-readable signal. The term "machine-readable signal" refers to any signal used to provide the machine instructions and/or data to a programmable processor.

To provide for an interaction with a user, the system and technology described herein may be implemented on the computer having a display apparatus (e.g., a CRT (cathode ray tube) or LCD (liquid crystal display) monitor) for displaying information to the user; and a keyboard and a pointing apparatus (e.g., a mouse or a trackball) by which the user may provide an input to the computer. Other kinds of apparatuses may also be used to provide for the interaction with the user; for example, a feedback provided to the user may be any form of a sensory feedback (e.g., a visual feedback, an auditory feedback, or a tactile feedback); and the input from the user may be received in any form, including an acoustic input, a speech input, or a tactile input.

The system and technology described herein may be implemented in a computing system that includes a back-end component (e.g., as a data server), or that includes a middleware component (e.g., an application server), or that includes a front-end component (e.g., the user computer having a graphical user interface or a web browser through which the user may interact with an implementation of the system and the technology described herein), or any combination of such back-end, middleware, or front-end components. The components of the system may be interconnected by any form or medium of digital data communication (e.g., a communication network). Examples of communication networks include a local Area Networks (LAN), a Wide Area Networks (WAN), and the Internet.

The computer system may include a client and a server. The client and the server are generally remote from each other and typically interact through the communication network. The relation of the client and the server arises by a virtue of computer programs running on the respective computers and having a client-server relation to each other.

With the technical scheme according to embodiments of the present disclosure, by acquiring the unstructured text and inputting the unstructured text into the encoder-decoder model, the output sequence is obtained. The output sequence includes the multiple attribute elements. Each attribute element corresponds to a respective attribute. Each attribute element includes the attribute value of the respective attribute. The encoder-decoder model is obtained and trained using the training text marked with the attribute values of various attributes. The structured representation is generated based on the attributes corresponding to the attribute elements included in the output sequence and the attribute values included in the attribute elements.

It should be understood that, various forms of flows shown above may be use to reorder, add or delete the steps. For example, the steps described in the present disclosure may be executed in parallel, sequentially, or in different orders, and are not limited herein as long as the desired results of the technical solutions disclosed in the present disclosure may be achieved.

The above-described embodiments are not intended to limit the scope of the present disclosure. It should be understood by those skilled in the art that, various modifications, combinations, sub-combinations and substitutions may be made, according to design requirements and other factors. Any modification, equivalent replacement, and improvement made within the spirit and principle of the present disclosure should be included in the protection scope of the present disclosure.

What is claimed is:

1. A method for structuring data, comprising:
acquiring an unstructured text;
inputting the unstructured text into an encoder-decoder model to obtain an output sequence, wherein the output sequence comprises a plurality of attribute elements, each attribute element corresponds to a respective attribute, and each attribute element comprises an attribute value of the respective attribute, wherein the encoder-decoder model is trained using a training text marked with the attribute value of each attribute; and
generating a structured representation based on the attributes corresponding to the attribute elements comprised in the output sequence and the attribute values comprised in the attribute elements,
wherein the encoder-decoder model comprises an encoder and a decoder, and inputting the unstructured text into the encoder-decoder model to obtain the output sequence comprises:
performing a word segmentation on the unstructured text to obtain a plurality of word elements;
sorting the plurality of word elements in order, to obtain an input sequence;
inputting the word elements of the input sequence into the encoder to semantically encode the word elements to obtain a hidden state vector of each word element, wherein the hidden state vector indicates semantics of the respective word element and a context thereof; and
decoding each hidden state vector by the decoder to obtain the attribute values of the output sequence, wherein the decoder has learned an attention weight of each hidden state vector with respect to each attribute value and a mapping relation between the hidden state vector that is weighted by the attention weight and the attribute value.

2. The method of claim 1, wherein the output sequence is in a data exchange format, the output sequence in the data exchange format comprises at least one object, and each object comprises a plurality of attribute elements,
wherein before inputting the unstructured text into the encoder-decoder model to obtain the output sequence, the method further comprises:
acquiring a plurality of training texts, wherein each training text has marked information in the data exchange format, the marked information comprises at least one object corresponding to an entity described by the training text, and each object comprises the attribute value of the attribute for describing the entity, wherein an order of the attribute values of the attributes in the object is the same as an order of the attribute elements of the attributes in the output sequence; and
training the encoder-decoder model by adopting the plurality of training texts to minimize an error between the output sequence of the encoder-decoder model and the marked information.

3. The method of claim 2, wherein generating the structured representation based on the attributes corresponding to the attribute elements comprised in the output sequence and the attribute values comprised in the attribute elements comprises:
for each object, extracting attribute elements belonging to the object from the output sequence in the data exchange format;
generating the structured representation of the object based on the attribute value of each attribute comprised in the attribute elements extracted; and
generating the structured representation of the unstructured text based on the structured representation of each object.

4. The method of claim 2, wherein the attribute value of each attribute is one of a text position and an actual text, the attribute value is determined based on a value range of the attribute, and in cases that the value range is limited, the attribute value is the actual text, and in cases that the value range is unlimited, the attribute value is the text position, wherein before generating the structured representation, the method further comprises:

for each attribute element, in cases that the attribute value is the text position, updating the attribute value to the word element at the text position in the unstructured text.

5. The method of claim 1, wherein sorting the plurality of word elements in order, to obtain the input sequence comprises:

inputting the plurality of word elements into an entity recognition model, to obtain an entity label of each word element; and splicing each word element with a respective entity label as a word element of the input sequence.

6. A computer device, comprising:

at least one processor; and a memory, communicatively coupled to the at least one processor, wherein the memory has instructions executable by the at least one processor stored therein, when the instructions are executed by the at least one processor, wherein the at least one processor is configured to:

acquire an unstructured text;

input the unstructured text into an encoder-decoder model to obtain an output sequence, wherein the output sequence comprises a plurality of attribute elements, each attribute element corresponds to a respective attribute, and each attribute element comprises an attribute value of the respective attribute, wherein the encoder-decoder model is trained using a training text marked with the attribute value of each attribute; and generate a structured representation based on the attributes corresponding to the attribute elements comprised in the output sequence and the attribute values comprised in the attribute elements, wherein the encoder-decoder model comprises an encoder and a decoder, and the at least one processor is further configured to:

perform a word segmentation on the unstructured text to obtain a plurality of word elements;

sort the plurality of word elements in order, to obtain an input sequence;

input the word elements of the input sequence into the encoder to semantically encode the word elements to obtain a hidden state vector of each word element, wherein the hidden state vector indicates semantics of the respective word element and a context thereof; and decode each hidden state vector by adopting the decoder to obtain the attribute values of the output sequence, wherein the decoder has learned an attention weight of each hidden state vector with respect to each attribute value and a mapping relation between the hidden state vector that is weighted by the attention weight and the attribute value.

7. The computer device of claim 6, wherein the output sequence is in a data exchange format, the output sequence in the data exchange format comprises at least one object, and each object comprises a plurality of attribute elements, wherein the at least one processor is further configured to:

acquire a plurality of training texts, wherein each training text has marked information in the data exchange format, the marked information comprises at least one object corresponding to an entity described by the training text, and each object comprises the attribute value of the attribute for describing the entity, wherein an order of the attribute values of the attributes of the object is the same as an order of the attribute elements of the attributes in the output sequence; and train the encoder-decoder model by adopting the plurality of training texts to minimize an error between the output sequence of the encoder-decoder model and the marked information.

8. The computer device of claim 7, wherein the at least one processor is further configured to:

for each object, extract attribute elements belonging to the object from the output sequence in the data exchange format;

generate the structured representation of the object based on the attribute value of each attribute comprised in the attribute elements extracted; and generate the structured representation of the unstructured text based on the structured representation of each object.

9. The computer device of claim 7, wherein the attribute value of each attribute is one of a text position and an actual text, the attribute value is determined according to a value range of the attribute, in cases that the value range is limited, the attribute value is the actual text, and in cases that the value range is unlimited, the attribute value is the text position, wherein the at least one processor is further configured to:

for each attribute element, in cases that the attribute value is the text position, update the attribute value to the word element at the text position in the unstructured text.

10. The computer device of claim 6, wherein the at least one processor is further configured to:

input the plurality of word elements into an entity recognition model to obtain an entity label of each word element; and splice each word element with a respective entity label as a word element of the input sequence.

11. A non-transitory computer readable storage medium, having computer instructions stored thereon, wherein the computer instructions are configured to cause a computer to execute a method for structuring data, the method comprising:

acquiring an unstructured text;

inputting the unstructured text into an encoder-decoder model to obtain an output sequence, wherein the output sequence comprises a plurality of attribute elements, each attribute element corresponds to a respective attribute, and each attribute element comprises an attribute value of the respective attribute wherein the encoder-decoder model is trained using a training text marked with the attribute value of each attribute; and generating a structured representation based on the attributes corresponding to the attribute elements comprised in the output sequence and the attribute values comprised in the attribute elements, wherein the encoder-decoder model comprises an encoder and a decoder, and inputting the unstructured text into the encoder-decoder model to obtain the output sequence comprises:

performing a word segmentation on the unstructured text to obtain a plurality of word elements;

sorting the plurality of word elements in order, to obtain an input sequence;

inputting the word elements of the input sequence into the encoder to semantically encode the word elements to obtain a hidden state vector of each word element, wherein the hidden state vector indicates semantics of the respective word element and a context thereof; and decoding each hidden state vector by the decoder to obtain the attribute values of the output sequence, wherein the decoder has learned an attention weight of each hidden state vector with respect to each attribute value and a mapping relation between the hidden state vector that is weighted by the attention weight and the attribute value.

12. The non-transitory computer readable storage medium of claim 11, wherein the output sequence is in a data exchange format, the output sequence in the data exchange format comprises at least one object, and each object comprises a plurality of attribute elements, wherein before inputting the unstructured text into the encoder-decoder model to obtain the output sequence, the method further comprises:

acquiring a plurality of training texts, wherein each training text has marked information in the data exchange format, the marked information comprises at least one object corresponding to an entity described by the training text, and each object comprises the attribute value of the attribute for describing the entity, wherein an order of the attribute values of the attributes in the object is the same as an order of the attribute elements of the attributes in the output sequence; and training the encoder-decoder model by adopting the plurality of training texts to minimize an error between the output sequence of the encoder-decoder model and the marked information.

13. The non-transitory computer readable storage medium of claim 12, wherein generating the structured representation based on the attributes corresponding to the attribute elements comprised in the output sequence and the attribute values comprised in the attribute elements comprises:

for each object, extracting attribute elements belonging to the object from the output sequence in the data exchange format;

generating the structured representation of the object based on the attribute value of each attribute comprised in the attribute elements extracted; and generating the structured representation of the unstructured text based on the structured representation of each object.

14. The non-transitory computer readable storage medium of claim 12, wherein the attribute value of each attribute is one of a text position and an actual text, the attribute value is determined based on a value range of the attribute, and in cases that the value range is limited, the attribute value is the actual text, and in cases that the value range is unlimited, the attribute value is the text position, wherein before generating the structured representation, the method further comprises:

for each attribute element, in cases that the attribute value is the text position, updating the attribute value to the word element at the text position in the unstructured text.

15. The non-transitory computer readable storage medium of claim 11, wherein sorting the plurality of word elements in order, to obtain the input sequence comprises:

inputting the plurality of word elements into an entity recognition model, to obtain an entity label of each word element; and splicing each word element with a respective entity label as a word element of the input sequence.

* * * * *